United States Patent [19]
Allen

[11] 3,776,278
[45] Dec. 4, 1973

[54] VALVE INCLUDING NOISE REDUCING MEANS

[75] Inventor: Ernest E. Allen, State Center, Iowa

[73] Assignee: Fisher Controls Company, Inc., Marshalltown, Iowa

[22] Filed: June 29, 1971

[21] Appl. No.: 157,906

Related U.S. Application Data

[63] Continuation-in-part of Ser. No. 863,099, Oct. 2, 1969, abandoned.

[52] U.S. Cl. .................. 137/625.38, 137/625.28
[51] Int. Cl. .......................... F15d 1/10, F16k 47/02
[58] Field of Search ............... 251/210; 137/625.32, 137/625.38, 625.37; 138/43, 39

[56] References Cited
UNITED STATES PATENTS

| | | | |
|---|---|---|---|
| 1,164,600 | 12/1915 | Forster | 137/625.37 |
| 1,923,118 | 8/1933 | Ruder et al. | 138/40 |
| 413,900 | 10/1889 | Blanchard | 137/625.32 |
| 951,267 | 3/1910 | Cator | 251/210 X |
| 1,802,897 | 4/1931 | Holden et al. | 251/210 |
| 2,764,181 | 9/1956 | Richolt | 137/625.37 |
| 3,219,059 | 11/1965 | Williams et al. | 137/625.37 X |

FOREIGN PATENTS OR APPLICATIONS

225,966   12/1924   Great Britain ............... 137/625.37

Primary Examiner—Arnold Rosenthal
Attorney—William I. Andress et al.

[57] ABSTRACT

A control valve including inlet and outlet ports, a valve seat and a cage member within which a valve plug is free to reciprocate toward and away from the valve seat to determine the flow therethrough. The cage member or valve plug are provided with a plurality of smooth-walled, narrow, substantially equally-spaced slots. In operation, the valve plug movement away from the valve seat controls fluid flow from the inlet port to the outlet port of the valve. The flow is directed through the slots, one dimension of which is sufficiently small (approximately 1/16 inch) to partition the flow, thereby to substantially attenuate the noise normally accompanying fluid flow through a control valve.

1 Claim, 7 Drawing Figures

INVENTOR
ERNEST E. ALLEN
BY
ATTORNEY

INVENTOR
ERNEST E. ALLEN

VALVE INCLUDING NOISE REDUCING MEANS

The present application is a continuation-in-part application of application Ser. No. 863,099, filed Oct. 2, 1969, now abandoned.

1. FIELD OF THE INVENTION

This application relates generally to fluid valves, and more particularly, to control valves having an internal structure which significantly reduces the noise normally generated by fluid flow through a valve.

2. BACKGROUND OF THE INVENTION AND DESCRIPTION OF THE PRIOR ART

In the field dealing with the design and manufacture of control valves, more and more attention has been directed to the problem of inherent noise generation of such valves. Industrial noise has become a significant problem; federal and local governments have begun enacting laws regulating many different forms of industrial noise. Until development of the present invention, many globe-type control valves used in certain fluid control applications could not pass the noise requirements of such laws, without some form of separate diffuser or silencer.

SUMMARY OF THE INVENTION

The general purpose of this invention is to provide a valve which embraces all of the advantages of similarly employed values, yet does not operate at an unacceptable noise level. To attain this, the present invention utilizes a unique internal structure which takes advantage of certain dimensions found to be critical to proper noise attenuation and serves to partition the fluid flow through the valve to reduce the ambient noise generation to an acceptable level.

An object of the present invention is the provision of a valve which operates at acceptable noise levels, without the use of additional silencing apparatus, or the like.

Another object of the present invention is the provision of a control valve, the internal structure of which achieves substantial noise attenuation.

A further object of the present invention is the provision of a low-noise control valve, the parts of which can be manufactured inexpensively and are compatible with conventional control valve parts.

In the present invention these purposes (as well as others apparent herein) are achieved generally by providing a valve having a body member defining inlet and outlet ports. The body member is provided with a valve seat interposed between the inlet and outlet ports. A valve plug is mounted within the valve body member for reciprocal movement toward and away from the valve seat, thereby to determine the valve flow rate. An annular cage member is secured within the valve body and arranged to allow the valve plug to reciprocate freely within it. The cage member is provided with a plurality of substantially smooth-walled, closely-spaced elongated slots, each having a width dimension at their narrowest point of about 1/16 inch. Fluid is caused to flow from the inlet port, through an opening determined by the relative position of the valve seat and valve plug, then through the smooth-walled elongated slots of the cage member to the outlet port. In this manner, the fluid flow is partitioned into a plurality of narrow steams, and the noise generation normally accompanying operation of a valve is substantially reduced.

In alternative embodiments, the valve plug, instead of the cage member, is provided with the elongated slots, and the flow caused to pass there-through as the valve plug is positioned relative to the valve seat.

BRIEF DESCRIPTION OF THE DRAWINGS

Utilization of the present invention will become apparent to those skilled in the art from the disclosures made in the following description of certain preferred embodiments, as illustrated in the accompanying drawing, in which.

DESCRIPTION OF THE PREFERRED EMBODIMENT OF THE INVENTION

Figure 1:
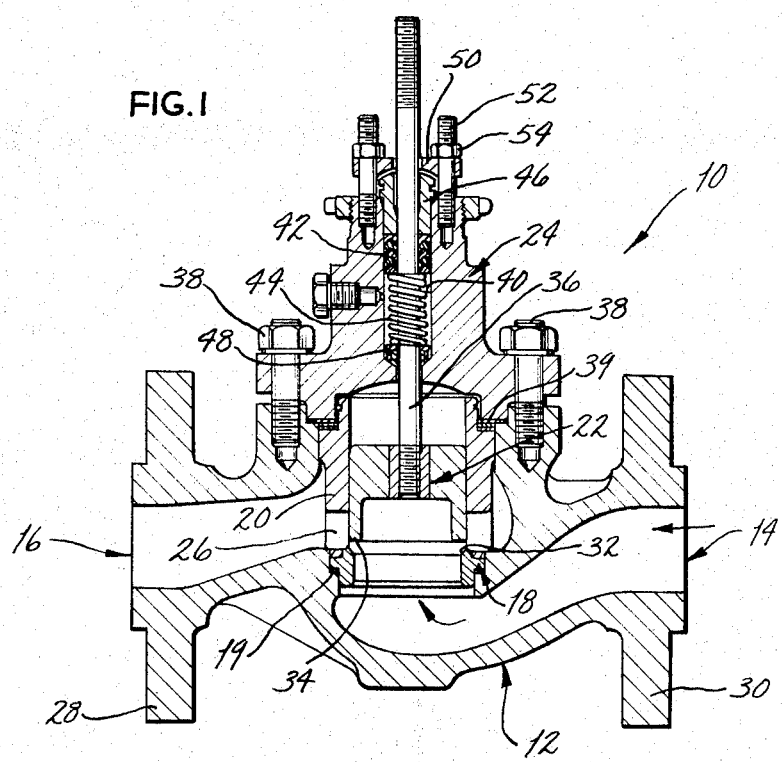
FIG. 1 is a cross-sectional view of a preferred embodiment of a control valve constructed in accordance with the present invention.

Referring now to the drawings, wherein like reference characters designate like or corresponding parts throughout the several views, there is shown in FIG. 1 a control valve, generally designated 10. The control valve 10 consists of a valve body 12, having inlet and outlet ports 14 and 16, respectively, a seat ring 18, a sleeve-like cage 20, a valve plug 22 and a bonnet assembly 24.

The inlet port 14 communicates with the outlet port 16 through the seat ring 18 and apertures 26 (hereinafter referred to as windows) provided in the cage 20. The seat ring 18 is positioned within a recess 19 provided within the valve body 12. The seat ring 18 is secured within the recess 19 by means of the cage 20, which in turn is secured against upward movement by the bonnet assembly 24. The valve body 12 is shown as having end coupling flanges 28 and 30; it being understood that other means may be provided for coupling the control valve 10 to piping or other apparatus in a fluid system.

The valve plug 22 is provided at its lower end with a bevelled surface 32 adapted to fit sealedly against a sealing surface 34 of the seat ring 18. A valve stem 36 is threadedly secured to the valve plug 22 at its lower end, and passes through the bonnet assembly 24, so that it can be engaged at its upper end by a conventional valve actuator (not shown).

The bonnet assembly 24 is fastened to the valve body 12 by means of threaded studs 38 and thereby secures the cage 20 and seat ring 18 to the valve body 12. As shown in FIG. 1, a laminated gasket 39 is employed between the surfaces of the bonnet assembly 24 and the cage 20 to provide a seal therebetween. The bonnet assembly 24 has a packing cavity 40, in which packing material 42 is held between a packing spring 44 and a packing follower 46. The packing follower 46, the packing material 42, and the packing spring 40 fit between the valve stem 36 and the bonnet assembly 24. At the lower end of the packing spring 44, there is provided a packing box ring 48, and at the upper end of the packing follower 46, there is provided a packing flange 50. Packing flange studs 52 are threadly secured to the bonnet assembly 24, such that the nuts 54 engage the packing flange 50 to restrain it against upward movement.

The control valve 10 described hereinabove, with the exception of the cage 20, is of well-known construction.

I have discovered that for many gas applications, the conventional control valve (which is normally unacceptably noisy) can be modified and operated in a manner to achieve substantial noise improvement. I have found that by restricting at least one dimension of the cage windows to about 1/16 inch, uniformly spacing the windows at substantially equal distances from each other, and flowing gas through the valve so that it passes from the interior of the cage to its exterior, the noise level of the valve can be reduced to a point where it is almost negligible.

Figure 2:
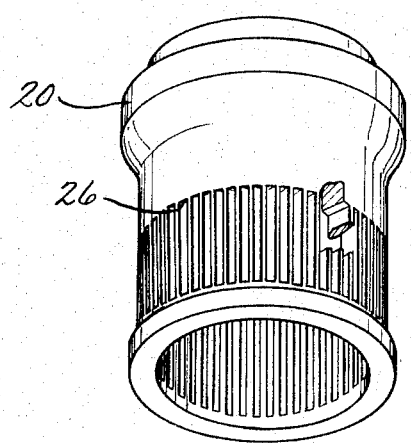
FIG. 2 is a detailed, partially broken-away, perspective view of a preferred cage member, employed with the control valve of FIG. 1.

Referring more specifically to FIG. 2, there is shown a sleeve-like cage 20 having windows 26 which take the form of substantially smooth-walled, elongated slots 26. These slots 26 are 1/16 inch in width at their narrowest point and are closely spaced at substantially equal distances from each other around the entire lower portion of the cage 20. It has been observed that the length of the slots 26 does not substantially affect the noise level of the valve 10, but by limiting the size of these windows to about 1/16 inch, the noise is attenuated to acceptable levels; in some instances by as much as 97 percent or 15 decibels compared to valves having conventional large cage windows. As may be seen in FIG. 2, the elongated slots 26 have their narrowest dimension (1/16 inch) intermediate their ends and taper or flare gradually to a wider dimension at the inner and outer surfaces. It has been found that these flared slots 26 achieve the desired noise abatement, and, in addition, enhance the capacity of the valve by as much as 10 percent relative to a valve having unflared or straight-walled slots.

Figure 4:
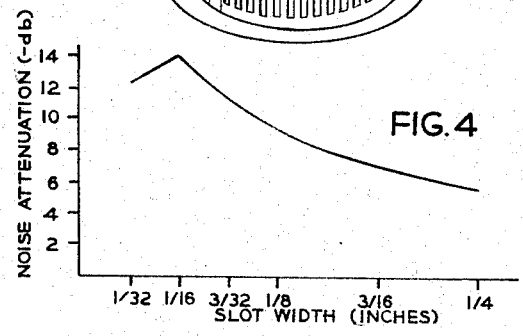
FIG. 4 is a graphical representation of the noise attenuation achieved employing various cage slot widths in the control valve of FIG. 1.

Although it is possible to achieve some noise improvement with slots widths or hole diameters of 1/8 or 1/4 inch, I have found that the optimum critical slot width or hole diameter is about 1/16 inch. As may be seen from FIG. 4, the noise attenuation achieved by reducing the slot width of the cage 20 of the control valve 10 increases gradually from 1/4 inch to 1/8 inch, then increases rapidly to a maximum of 13.5 db at 1/16 inch, and then decreases as the slot width becomes even smaller.

Figure 3:
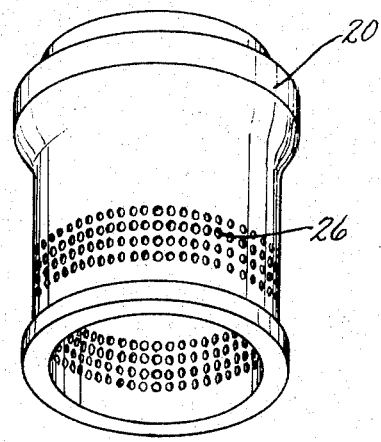
FIG. 3 is a perspective view of an alternative cage member which may be used with the control valve of FIG. 1.

Another form of a cage 20 for substantially reducing the noise of the control valve 10 is shown in FIG. 3. The "windows" of the cage member 20' of FIG. 3 take the form of small circular holes 26' which are closely spaced, uniformly distributed around the cage 20', and have a diameter of about 1/16 inch.

It is important to note that the total area (capacity) of the plurality of both the slots 26 or holes 26' in the cage 20 is chosen to be substantially equal to that of the large openings or holes provided in the cages of conventional valves having the same flow rate capacity.

In operation gas is caused to flow into the inlet port 14 of the valve 10, through the opening determined by the relative position of the valve plug 22 and the seat ring 18, into the interior of the cage 20, then through the cage windows 26 to the outlet port 16. The partitioning of the gas flow into extremely small streams results in substantial noise abatement, yet does not effect the capacity of the valve.

Figure 5:
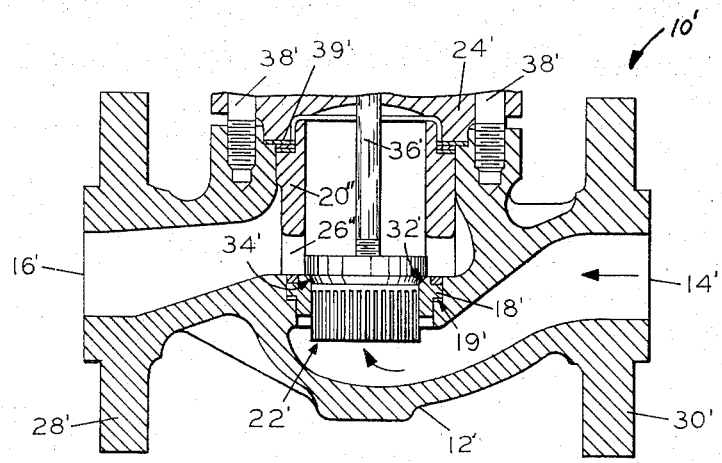
FIG. 5 is a view similar to FIG. 1 employing a slotted valve plug, rather than a slotted valve cage member.
Figure 6:
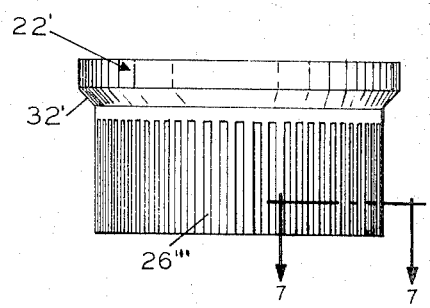
FIG. 6 is a perspective view of the slotted valve plug of FIG. 5.
Figure 7:
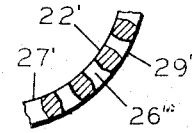
FIG. 7 is a partial, cross-sectional view of the valve plug of FIG. 6, taken along line 7—7.

An alternative embodiment of the control valve 10 is shown in FIG. 5 and is referred to herein as control valve 10'. The control valve 10', instead of having a slotted cage member as employed in the control valve 10, includes a conventional cage member 20'' having four equally spaced windows 26'' whose width dimensions are not critical. However, the control valve 10' employs a slotted valve plug 22', the upper portion of which is provided with a bevelled surface 32' for cooperating with the sealing surface 34' of the seat ring 18 to effect a tight, shut-off seal when the valve plug 22' is reciprocated to its lowermost position. The lower or skirt portion of the valve plug 22' is of a diameter such that it may be received within the seat ring 18' and is provided with elongated, closely spaced slots 26''', similar to the slots 26 of the cage member 20 of the valve 10. That is, the slots 26''', as may be best seen in FIGS. 6 and 7, flare or taper outwardly from a narrowmost point approximately 1/32 to 3/32 inches wide, and preferably 1/16 inch wide, intermediate the inner and outer surfaces 27' and 29' respectively, and extend to a point where they are coextensive with the inner and outer surfaces 27' and 29' of the valve plug 22'.

The operation of the valve 10' should be apparent; the plug 22' may be reciprocated up and down to allow more or less fluid to flow through that portion of the slots 26''' presented thereto as the plug 22' moves toward and away from the sealing surface 34'.

Many modifications and variations of the present invention are possible in light of the above teachings. Therefore, it is to be understood that the invention may be practiced otherwise than as specifically described

I claim:

1. A valve for controlling the flow of gas and minimizing noise generated thereby, comprising
   a body having inlet and outlet ports,
   a valve seat positioned between said ports,
   a valve plug member having inner and outer surfaces and mounted within said valve body for reciprocal movement toward and away from said valve seat, thereby to determine the flow through said valve, said valve plug having a plurality of substantially smooth-walled elongated slots with their longitudinal dimension substantially parallel to the direction of reciprocal movement of said valve plug and each having a critical minimum width dimension in the range of from about 1/32 inch to 3/32 inch, said slots tapering outwardly from said minimum width dimension and in the direction of gas flow to the intersection with one of said inner and outer surfaces, and
   a cage member mounted within said valve body and circumferentially disposed with respect to said valve plug,
   whereby said slots of said plug member attenuate noise generation normally accompanying gas flow through the valve.

* * * * *